(12) United States Patent
Peachey et al.

(10) Patent No.: US 7,929,263 B1
(45) Date of Patent: Apr. 19, 2011

(54) UNLATCH FEATURE FOR LATCHING ESD PROTECTION CIRCUIT

(75) Inventors: Nathaniel Peachey, Oak Ridge, NC (US); Carlos Gamero, High Point, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 506 days.

(21) Appl. No.: 11/832,114

(22) Filed: Aug. 1, 2007
(Under 37 CFR 1.47)

(51) Int. Cl.
*H02H 9/00* (2006.01)
(52) U.S. Cl. ........................................ 361/56
(58) Field of Classification Search ............. 361/56
See application file for complete search history.

(56) References Cited

U.S. PATENT DOCUMENTS

| | | | | |
|---|---|---|---|---|
| 5,255,146 A | * | 10/1993 | Miller | 361/56 |
| 5,825,603 A | * | 10/1998 | Parat et al. | 361/111 |
| 5,946,177 A | * | 8/1999 | Miller et al. | 361/56 |
| 6,137,702 A | * | 10/2000 | Hall et al. | 363/95 |
| 6,912,109 B1 | * | 6/2005 | Ker et al. | 361/56 |
| 7,027,275 B2 | * | 4/2006 | Smith | 361/56 |
| 7,440,248 B2 | * | 10/2008 | Arai et al. | 361/56 |
| 2007/0171587 A1 | * | 7/2007 | Lee et al. | 361/56 |

OTHER PUBLICATIONS

Smith, Jeremy C., "A MOSFET Power Supply Clamp with Feedback Enhanced Triggering for ESD Protection in Advanced CMOS Technologies," Proc. EOS/ESD 2003, pp. 8-16, ESD Association.

* cited by examiner

*Primary Examiner* — Jared J Fureman
*Assistant Examiner* — Scott Bauer
(74) *Attorney, Agent, or Firm* — Withrow & Terranova, P.L.L.C.

(57) ABSTRACT

The present invention is a latching electrostatic discharge (ESD) protection circuit that enables and latches an ESD clamping circuit upon an ESD event, and disables and un-latches the ESD clamping circuit upon either a drop in the DC supply voltage below a defined threshold or a time-out. The time-out protects against effects of inadvertent latching or any anomaly in which the latching ESD clamping circuit does not un-latch. An ESD event is a voltage spike between the DC supply voltage and ground wherein the ESD clamping circuit applies a low impedance between the DC supply voltage and ground to dissipate the energy contained in the voltage spike, thereby protecting adjacent circuitry.

25 Claims, 3 Drawing Sheets

UNLATCH FEATURE FOR LATCHING ESD PROTECTION CIRCUIT

FIELD OF THE INVENTION

The present invention relates to electrostatic discharge protection circuits used in electronic circuits, particularly digital integrated circuits.

BACKGROUND OF THE INVENTION

Electrostatic discharge (ESD) has become increasingly problematic in semiconductor circuitry as circuit densities have grown and device sizes have become smaller. Very thin oxide layers are vulnerable to the voltages present in ESD events, which frequently occur in electronic devices that come into contact with a user's body. When a user picks up an electronic device, static charge stored between a user's body and ground can be coupled into the electronic device's electronic circuitry. As a result, ESD protection circuits are often required.

Older ESD protection circuits using snapback N-type metal oxide semiconductor (NMOS) technology and silicon controlled rectifier (SCR) technology have largely been replaced with ESD rail clamping circuits, particularly in integrated circuits with line widths less than 0.5 micrometers. Most of the pads on an integrated circuit are coupled to the power supply rails with reversed biased diodes; therefore, a positive ESD voltage spike will forward bias the diode connected to the direct current (DC) supply rail, thereby raising the voltage on the DC supply. An ESD clamping circuit is connected between the DC supply and ground and is triggered by the fast rising edge of the ESD spike. When a fast rising edge spike is shunted to the DC supply, the ESD clamping circuit turns on and applies a low impedance load between the DC supply and ground to dissipate the energy in the ESD voltage spike.

Two types of ESD clamping circuits are commonly used. The first type is a time-based ESD clamping circuit, wherein a low impedance load is applied upon an ESD event for a specified time period, such as two or three microseconds. Since the time constant is relatively long, this type of clamping circuit may turn on each time the power is applied to the integrated circuit. When the low impedance is applied, current surge results, which can be as high as several hundred milliamperes for the specified time period. For many applications, this may not be a problem. However, for circuits such as large switching arrays in some DC-to-DC converters, this can be unacceptable. In these designs, current surges may occur on the DC supply every time the circuit switches. This type of clamping circuit may falsely detect these surges on the power rails from DC-to-DC converter circuits as ESD events. Since the switching cycle is typically shorter than the microsecond clamping event, a large leakage current from the clamping device occurs. These factors can significantly increase average power consumption, which may be problematic, particularly in battery powered applications.

The second type of ESD clamping circuit is a latching ESD clamping circuit, wherein a low impedance load is applied upon an ESD event until the energy associated with the ESD event has been dissipated. The latching ESD clamping circuit latches into an "on" state, and remains in the "on" state until the DC supply voltage drops below a defined threshold. This type of clamping circuit does not turn on when power is applied to the integrated circuit, and is less susceptible to DC-to-DC converter power surges than the time-based ESD clamping circuit. Since the latching ESD clamping circuit is only on for the duration of an ESD event, current surges are smaller than the time-based ESD clamping circuit, resulting in less average current consumption and power dissipation than the time-based ESD clamping circuit.

Even though the latching ESD clamping circuit has several advantages over the time-based ESD clamping circuit, one disadvantage is that if the latching ESD clamping circuit becomes inadvertently latched due to a very fast current surge or other anomaly when the DC bias is high, there is a risk of it not releasing, or disrupting normal circuit operation. While the risk of inadvertent latching can be reduced through careful design, it may not be possible to eliminate it entirely. Therefore, a need exists for a latching ESD clamping circuit that releases quickly and reliably.

SUMMARY OF THE INVENTION

The present invention is a latching electrostatic discharge (ESD) protection circuit that enables and latches an ESD clamping circuit upon an ESD event, and disables and un-latches the ESD clamping circuit upon either a drop in the DC supply voltage below a defined threshold or a time-out. The time-out protects against effects of inadvertent latching or any anomaly in which the latching ESD clamping circuit does not un-latch. An ESD event is a voltage spike between the DC supply voltage and ground, wherein the ESD clamping circuit applies a low impedance path between the DC supply voltage and ground to dissipate the energy contained in the voltage spike, thereby protecting adjacent circuitry.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a latching electrostatic discharge (ESD) protection circuit that enables and latches an ESD clamping circuit upon an ESD event, and disables and unlatches the ESD clamping circuit upon either a drop in the DC supply voltage below a low voltage threshold or a time-out. The time-out protects against effects of inadvertent latching or any anomaly in which the latching ESD clamping circuit does not un-latch. An ESD event is a voltage spike between the DC supply voltage and ground, wherein the ESD clamping circuit applies a low impedance path between the DC supply voltage and ground to dissipate the energy contained in the voltage spike, thereby protecting adjacent circuitry.

Figure 1:
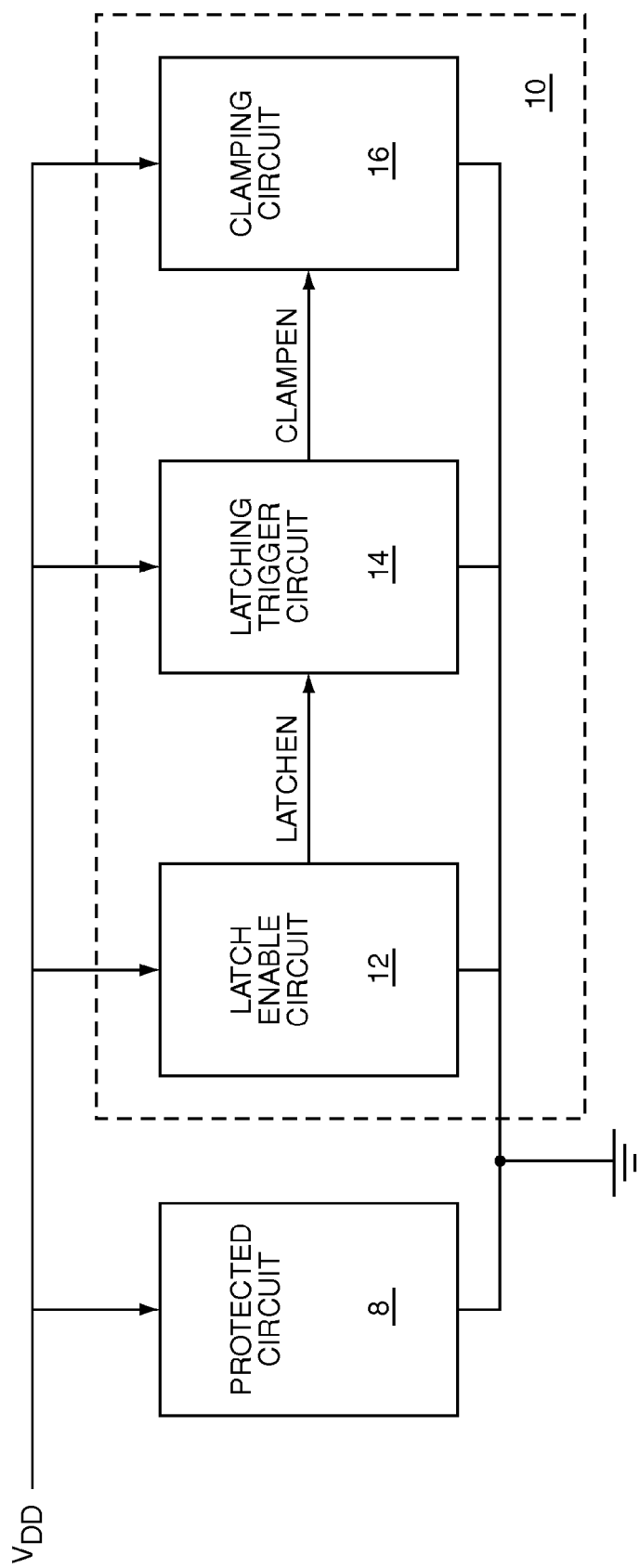
FIG. 1 shows a block diagram of a latching ESD clamping circuit and an ESD protected circuit according to one embodiment of the present invention.

One embodiment of the present invention is an ESD protected circuit 8 and a latching ESD clamping circuit 10 as shown in FIG. 1. The latching ESD clamping circuit 10 protects the ESD protected circuit 8 from ESD events. A latch enable circuit 12 provides a latch enable signal LATCHEN to a latching trigger circuit 14. The latch enable circuit 12 monitors the voltage between its DC supply voltage $V_{DD}$ and ground. If a voltage spike in excess of a high threshold voltage is detected, which would be indicative of an ESD event, then the latch enable signal LATCHEN transitions from its inactive state to its active state for a time-out period. After the time-out period, the latch enable signal LATCHEN transitions back to its inactive state. The time-out period is long enough to allow the energy from an ESD event to be dissipated, and short enough to prevent excessive current consumption. The time-out period may be greater than 50 nanoseconds and typically is between one and two microseconds.

The latching trigger circuit 14 provides a clamping signal CLAMPEN to a clamping circuit 16. The latching trigger circuit 14 monitors the voltage between its DC supply voltage $V_{DD}$ and ground. If a voltage spike in excess of the high threshold voltage is detected, and the latch enable signal LATCHEN is in its active state, then the latching trigger circuit 14 transitions from a high impedance state into a low impedance state, and remains latched in the low impedance state until the latch enable signal LATCHEN transitions to its inactive state, or the voltage between the DC supply voltage $V_{DD}$ and ground drops below a low threshold voltage. When the latching trigger circuit 14 is in the low impedance state, the clamping signal CLAMPEN is in a clamping state, and when the latching trigger circuit 14 is in the high impedance state, the clamping signal CLAMPEN is in a non-clamping state. The clamping circuit 16 applies a low impedance, which may be less than 10 ohms, between the DC supply voltage $V_{DD}$ and ground when the clamping signal CLAMPEN is in the clamping state. The clamping circuit 16 applies a high impedance, which may be greater than 10 ohms, between the DC supply voltage $V_{DD}$ and ground when the clamping signal CLAMPEN is in the non-clamping state. The clamping circuit may include a single transistor, or may include a transistor array. Some embodiments of the present invention may use N-type metal oxide semiconductor (NMOS) transistors to provide the low impedance between the DC supply voltage $V_{DD}$ and ground.

Figure 2:
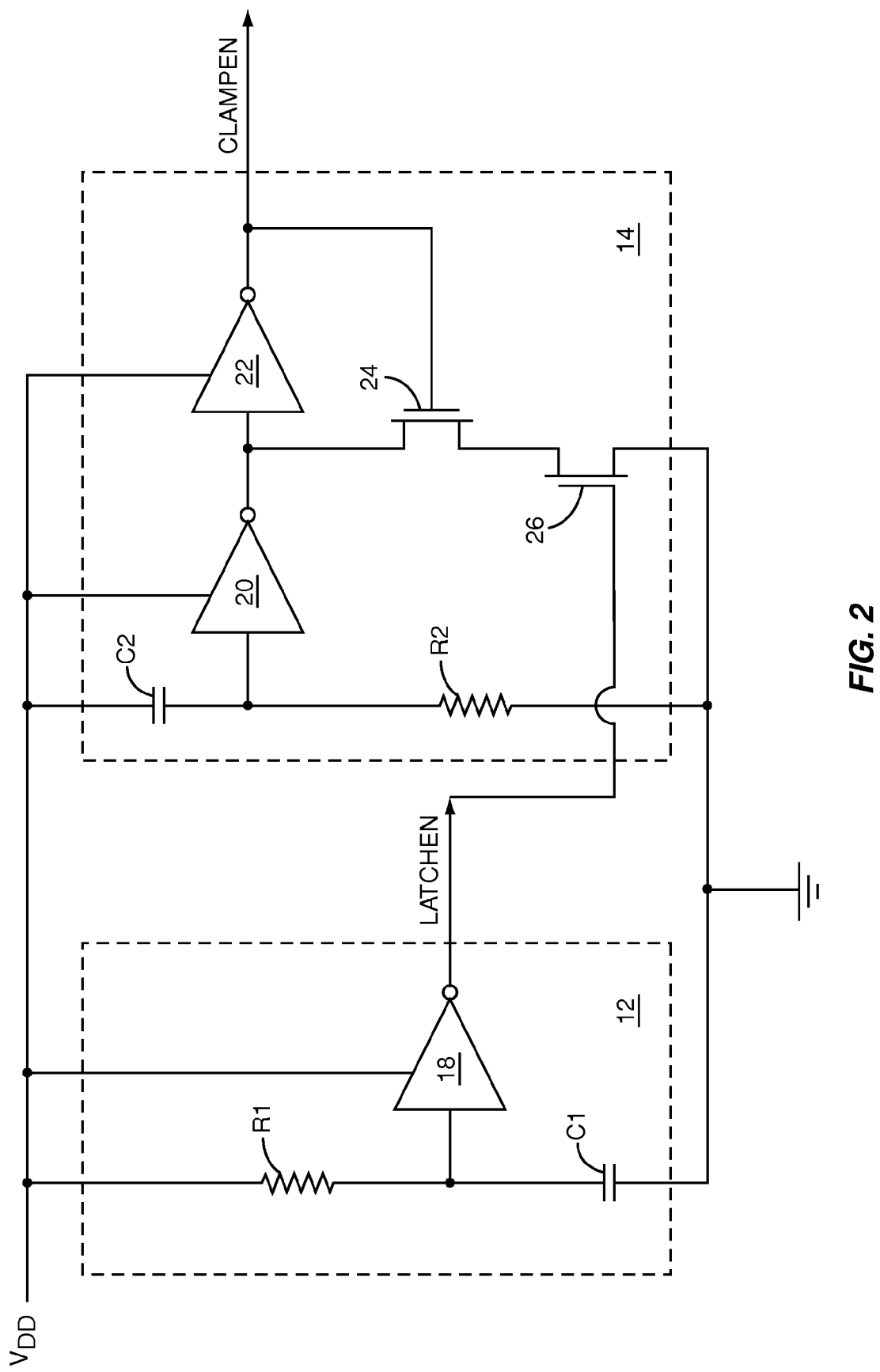
FIG. 2 shows details of the latch enable circuit and the latching trigger circuit of FIG. 1 according to one embodiment of the present invention.

FIG. 2 shows details of one embodiment of the latch enable circuit 12 and the latching trigger circuit 14. A latch enable resistor R1 and a latch enable capacitor C1 feed a first inverter 18, which provides the latch enable signal LATCHEN. In a steady state condition, the latch enable capacitor C1 charges up to the DC supply voltage $V_{DD}$, which feeds the input to the first inverter 18; therefore, the output of the first inverter 18 is low, which is the inactive state of the latch enable signal LATCHEN. When a voltage spike between the DC supply voltage $V_{DD}$ and ground occurs, the supply voltage of the first inverter 18 follows the voltage spike, thereby raising the input voltage threshold of the first inverter 18. Since the voltage across the latch enable capacitor C1 cannot change instantaneously, if the input voltage threshold of the first inverter 18 raises above the nominal voltage of the DC supply voltage $V_{DD}$, then the output of the first inverter 18 will transition to high, which is the active state of the latch enable signal LATCHEN. The latch enable signal LATCHEN will remain in its active state until either the latch enable resistor R1 charges up the latch enable capacitor C1 to the new input voltage threshold, or the voltage spike between the DC supply voltage $V_{DD}$ and ground drops, thereby lowering the input voltage threshold to match the voltage across the latch enable capacitor C1, or both. The latch enable resistor R1 and the latch enable capacitor C1 determine the time-out period. Some embodiments of the present invention may implement the latch enable resistor R1 and the latch enable capacitor C1 using active elements. The latch enable resistor R1 may be implemented using a long, narrow channel P-type metal oxide semiconductor (PMOS) transistor, which has its gate coupled to ground. It could also be a long, narrow channel N-type metal oxide semiconductor (NMOS) transistor having its gate coupled to $V_{DD}$.

A trigger resistor R2 and a trigger capacitor C2 feed a second inverter 20, which feeds a third inverter 22, which provides the clamping signal CLAMPEN. In a steady state condition, the trigger capacitor C2 charges down to ground, which feeds the input to the second inverter 20; therefore, the output of the second inverter 20 is high, and the output of the third inverter 22 is low, which is the non-clamping state of the clamping signal CLAMPEN. When a voltage spike between the DC supply voltage $V_{DD}$ and ground occurs, the supply voltage of the second and third inverters 20, 22 follows the voltage spike, thereby raising the input voltage thresholds of the second and third inverters 20, 22. Since the voltage across the trigger capacitor C2 cannot change instantaneously, and since the voltage across the trigger capacitor C2 is the nominal voltage of the DC supply voltage $V_{DD}$, if the input voltage threshold of the first inverter 18 raises above the difference between the voltage spike and the nominal voltage of the DC supply voltage $V_{DD}$, then the output of the second inverter 20 will transition to low, and the output of the third inverter 22 will transition to high, which is the clamping state of the clamping signal CLAMPEN.

The output of the third inverter 22 drives the gate of a latching transistor 24. The drain of the latching transistor 24 is coupled to the input of the third inverter 22. The source of the latching transistor 24 is coupled to the drain of a latch enable transistor 26. The source of the latch enable transistor 26 is coupled to ground, and the gate of the latch enable transistor 26 receives the latch enable signal LATCHEN. If the latch enable signal LATCHEN is in its active state, the latch enable transistor 26 is turned on; therefore, when the output of the third inverter 22 transitions to high, the latching transistor 24 will pull the input of the third inverter 22 to low, thereby latching the third inverter 22 in the low impedance state. The low impedance state provides the clamping state of the clamping signal CLAMPEN. The third inverter 22 will remain latched in the low impedance state until the latch enable signal LATCHEN transitions to its inactive state, which turns off the latch enable transistor 26, thereby turning off the latching transistor 24. The time constant of the trigger resistor R2 and trigger capacitor C2 is typically a few nanoseconds, which is long enough to allow latching of the third inverter 22, but much shorter than a typical ESD event. The on resistances of the latching transistor 24 and the latch enable transistor 26 must be low enough to overcome the output impedance of the second inverter 20 for proper latching.

The high voltage and low voltage thresholds are determined by the shifts in the input thresholds of the first and second inverters 18, 20 due to the magnitude of the voltage spike between the DC supply voltage $V_{DD}$ and ground. In an exemplary embodiment of the present invention, the high and low voltage thresholds may be substantially 200% of the nominal DC supply voltage $V_{DD}$. In other embodiments of the present invention, the high voltage threshold may be greater than 150% of the nominal DC supply voltage $V_{DD}$ and the low voltage threshold may be less than 300% of the nominal DC supply voltage $V_{DD}$. To be detected as an ESD event, the voltage spike must have a fast rising edge of sufficient magnitude.

Figure 3:
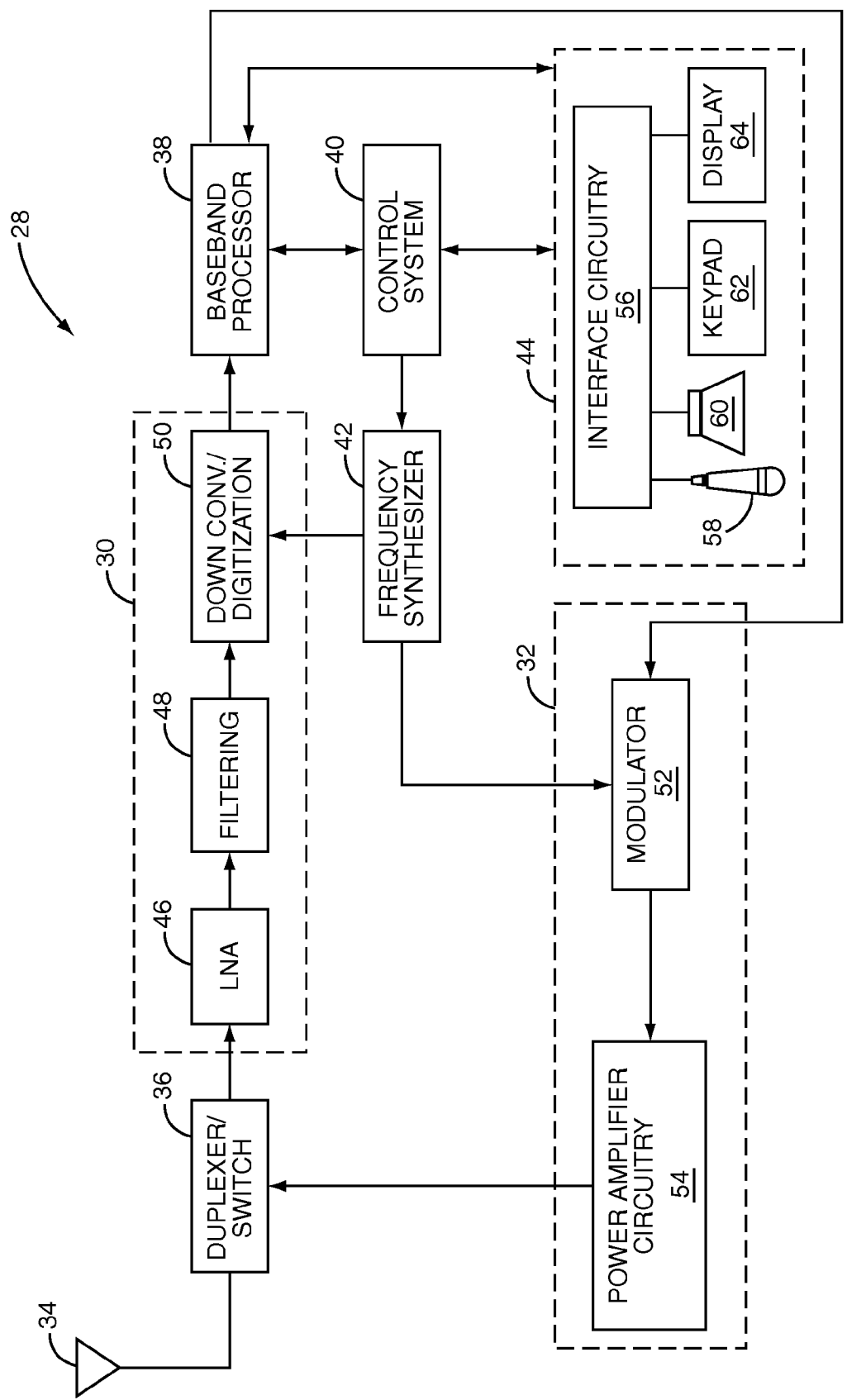
FIG. 3 shows an application example of the present invention used in a mobile terminal according to one embodiment of the present invention.

An application example of a latching ESD clamping circuit is its use in a mobile terminal 28. The basic architecture of the mobile terminal 28 is represented in FIG. 3 and may include a receiver front end 30, a radio frequency transmitter section 32, an antenna 34, a duplexer or switch 36, a baseband processor 38, a control system 40, a frequency synthesizer 42, and an interface 44. The receiver front end 30 receives information bearing radio frequency signals from one or more remote transmitters provided by a base station. A low noise amplifier (LNA) 46 amplifies the signal. A filter circuit 48 minimizes broadband interference in the received signal, while downconversion and digitization circuitry 50 downconverts the filtered, received signal to an intermediate or baseband frequency signal, which is then digitized into one or more digital streams. The receiver front end 30 typically uses one or more mixing frequencies generated by the frequency synthesizer 42. The baseband processor 38 processes the digitized received signal to extract the information or data bits conveyed in the received signal. This processing typically comprises demodulation, decoding, and error correction operations. As such, the baseband processor 38 is generally implemented in one or more digital signal processors (DSPs).

On the transmit side, the baseband processor 38 receives digitized data, which may represent voice, data, or control information, from the control system 40, which it encodes for transmission. The encoded data is output to the transmitter 32, where it is used by a modulator 52 to modulate a carrier signal that is at a desired transmit frequency. Power amplifier circuitry 54 amplifies the modulated carrier signal to a level appropriate for transmission, and delivers the amplified and modulated carrier signal to the antenna 34 through the duplexer or switch 36.

A user may interact with the mobile terminal 28 via the interface 44, which may include interface circuitry 56 associated with a microphone 58, a speaker 60, a keypad 62, and a display 64. The interface circuitry 56 typically includes analog-to-digital converters, digital-to-analog converters, amplifiers, and the like. Additionally, it may include a voice encoder/decoder, in which case it may communicate directly with the baseband processor 38. The microphone 58 will typically convert audio input, such as the user's voice, into an electrical signal, which is then digitized and passed directly or indirectly to the baseband processor 38. Audio information encoded in the received signal is recovered by the baseband processor 38, and converted by the interface circuitry 56 into an analog signal suitable for driving the speaker 60. The keypad 62 and display 64 enable the user to interact with the mobile terminal 28, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A circuit comprising:
   an electrostatic discharge (ESD) protected circuit that is coupled between a direct current (DC) supply voltage and an electrical ground; and
   a latching ESD protection circuit that is coupled between the DC supply voltage and the electrical ground and comprising a feedback loop, the latching ESD protection circuit being adapted to:
   generate a latch enable signal independently of the feedback loop, wherein in response to an amplitude of a voltage between the DC supply voltage and the electrical ground exceeds a high threshold, the latch enable signal is in a disable state after a first time period and the feedback loop turns off in response to the disable state of the latch enable signal;
   providing a high impedance between the DC supply voltage and the electrical ground during a high impedance state;
   providing a low impedance between the DC supply voltage and the electrical ground during a low impedance state;
   transitioning from the high impedance state to the low impedance state wherein the feedback loop latches the latching ESD protection circuit in the low impedance state when the amplitude of the voltage between the DC supply voltage and the electrical ground exceeds the high threshold; and
   transitioning from the low impedance state to the high impedance state by unlatching the ESD protection circuit wherein the feedback loop is off when the first time period is exceeded,
   wherein the latching ESD protection circuit protects the ESD protected circuit from damage due to ESD events.

2. The latching ESD protection circuit of claim 1 wherein the first time period begins when the high impedance state transitions to the low impedance state.

3. The latching ESD protection circuit of claim 1 further adapted to transition from the low impedance state to the high impedance state when the amplitude of the voltage between the DC supply voltage and the electrical ground drops below a low threshold.

4. The latching ESD protection circuit of claim 3 wherein the low threshold is less than 300 percent of a nominal amplitude of the voltage between the DC supply voltage and the electrical ground.

5. The latching ESD protection circuit of claim 1 wherein an impedance between the DC supply voltage and the electrical ground during the high impedance state is greater than 10 ohms.

6. The latching ESD protection circuit of claim 1 wherein an impedance between the DC supply voltage and the electrical ground during the low impedance state is less than 10 ohms.

7. The latching ESD protection circuit of claim 1 wherein the high threshold is greater than 150 percent of a nominal amplitude of the voltage between the DC supply voltage and the electrical ground.

8. The latching ESD protection circuit of claim 1 wherein the first time period is greater than 50 nanoseconds.

9. The latching ESD protection circuit of claim 1 further comprising a latch enable circuit adapted to
   provide a latch enable signal with an enable state and the disable state;
   transition from the disable state to the enable state when the amplitude of the voltage between the DC supply voltage and the electrical ground exceeds the high threshold; and
   transition from the enable state to the disable state when the first time period is exceeded.

10. The latch enable circuit of claim 9 further adapted to transition from the enable state to the disable state when the amplitude of the voltage between the DC supply voltage and the electrical ground drops below a low threshold.

11. The latching ESD protection circuit of claim 10 wherein the latch enable circuit further comprises a timing circuit comprising a resistive element coupled to a capacitive element, wherein the timing circuit determines the first time period.

12. The latching ESD protection circuit of claim 11 wherein the resistive element further comprises a metal oxide semiconductor.

13. The latching ESD protection circuit of claim 12 wherein a length of a channel of the metal oxide semiconductor is at least three times as long as a width of the channel, and the metal oxide semiconductor is of a P-type material.

14. The latching ESD protection circuit of claim 10 further comprising a latching trigger circuit, wherein the latching trigger circuit enters the low impedance state when the amplitude of the voltage between the DC supply voltage and the electrical ground exceeds the high threshold.

15. The latching ESD protection circuit of claim 14 wherein the latching trigger circuit is adapted to receive the latch enable signal and maintains the low impedance state, once entered, if the latch enable signal is in the enable state, and the amplitude of the voltage between the DC supply voltage and the electrical ground exceeds the low threshold.

16. The latching ESD protection circuit of claim 15 wherein the latching trigger circuit further comprises a latching transistor element adapted to maintain the low impedance state.

17. The latching ESD protection circuit of claim 16 wherein the latching trigger circuit further comprises a latching enable transistor element coupled to the latching transistor element, and the latching enable transistor element is adapted to receive the latch enable signal and enable the latching transistor element based on the latch enable signal.

18. The latching ESD protection circuit of claim 15 wherein the latching trigger circuit transitions from the low impedance state to the high impedance state when the latch enable signal transitions from the enable state to the disable state.

19. The latching ESD protection circuit of claim 9 further comprising a latching trigger circuit adapted to provide a clamping signal, wherein the clamping signal is in a clamping state during the low impedance state, and the clamping signal is in a non-clamping state during the high impedance state.

20. The latching ESD protection circuit of claim 19 further comprising a clamping circuit adapted to:
   receive the clamping signal;
   provide the low impedance between the DC supply voltage and the electrical ground during the clamping state; and
   provide the high impedance between the DC supply voltage and the electrical ground during the non-clamping state.

21. The latching ESD protection circuit of claim 1 further comprising:
   a trigger capacitor coupled between the DC supply voltage and an input to a gate; and
   a trigger resistor coupled between the input to the gate and the electrical ground.

22. The latching ESD protection circuit of claim 1 wherein the transition from the high impedance state to the low impedance state is based on an ESD event.

23. A method comprising:
   providing an electrostatic discharge (ESD) protected circuit between a direct current (DC) supply voltage and an electrical ground;
   providing a latching ESD protection circuit between the DC supply voltage and the electrical ground, wherein the latching ESD circuit includes a feedback loop;
   generating a latch enable signal independently of the feedback loop, wherein in response to an amplitude of a voltage between the DC supply voltage and the electrical ground exceeding a high threshold, the latch enable signal is in a disable state after a first time period and the feedback loop turns off in response to the disable state of the latch enable signal;
   providing a high impedance between the DC supply voltage and the electrical ground during a high impedance state;
   providing a low impedance between the DC supply voltage and the electrical ground during a low impedance state;
   transitioning from the high impedance state to the low impedance state wherein the feedback loop latches the latching ESD protection circuit in the low impedance state when the amplitude of the voltage between the DC supply voltage and the electrical ground exceeds the high threshold; and
   transitioning from the low impedance state to the high impedance state by unlatching the ESD protection circuit wherein the feedback loop is off when the first time period is exceeded,
wherein the latching ESD protection circuit protects the ESD protected circuit from damage due to ESD events.

24. The method of claim 23 further comprising:
   a trigger capacitor coupled between the DC supply voltage and an input to a gate; and
   coupling a trigger resistor between the input to the gate and the electrical ground.

25. The method of claim 23 wherein the transitioning from the high impedance state to the low impedance state is based on an ESD event.

* * * * *